(12) United States Patent
Watson

(10) Patent No.: US 10,333,228 B2
(45) Date of Patent: Jun. 25, 2019

(54) LOW COUPLING 2×2 MIMO ARRAY

(71) Applicant: Huawei Technologies Co., Ltd., Shenzhen (CN)

(72) Inventor: Paul Robert Watson, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/193,938

(22) Filed: Jun. 27, 2016

(65) Prior Publication Data

US 2017/0179610 A1 Jun. 22, 2017

Related U.S. Application Data

(60) Provisional application No. 62/270,417, filed on Dec. 21, 2015.

(51) Int. Cl.
| | | |
|---|---|---|
| *H01Q 15/14* | (2006.01) | |
| *H01Q 21/06* | (2006.01) | |
| *H01Q 1/36* | (2006.01) | |
| *H01Q 1/48* | (2006.01) | |
| *H01Q 9/04* | (2006.01) | |
| *H04L 5/14* | (2006.01) | |
| *H01Q 21/00* | (2006.01) | |
| *H01Q 21/28* | (2006.01) | |

(Continued)

(52) U.S. Cl.
CPC .............. *H01Q 15/14* (2013.01); *H01Q 1/36* (2013.01); *H01Q 1/48* (2013.01); *H01Q 9/0435* (2013.01); *H01Q 9/0457* (2013.01); *H01Q 9/0485* (2013.01); *H01Q 21/0075* (2013.01); *H01Q 21/065* (2013.01); *H01Q 21/24* (2013.01); *H01Q 21/26* (2013.01); *H01Q 21/28* (2013.01); *H04L 5/14* (2013.01)

(58) Field of Classification Search
CPC ........ H01Q 15/14; H01Q 1/48; H01Q 9/0485; H01Q 1/36; H01Q 21/065; H01Q 21/06; H04L 5/14
USPC .................................. 343/797, 700 MS, 834
See application file for complete search history.

(56) References Cited

U.S. PATENT DOCUMENTS

| | | | | |
|---|---|---|---|---|
| 5,661,494 A | * | 8/1997 | Bondyopadhyay | .... H01Q 1/364 343/700 MS |
| 6,067,053 A | * | 5/2000 | Runyon | ................. H01Q 1/246 343/700 MS |

(Continued)

FOREIGN PATENT DOCUMENTS

WO    2015127876 A1    9/2015

OTHER PUBLICATIONS

International Search Report from PCT/CN2016/094373 dated Nov. 4, 2016.

(Continued)

*Primary Examiner* — Hai V Tran

(57) ABSTRACT

A 2×2 MIMO array antenna is provided which includes two separate radiating elements mounted to an antenna reflector. Each element is linear polarized with two orthogonal polarizations, one polarization excited by a transmit port and the other polarization receiving radiated signals destined for a receive port. The two elements are aligned that the polarizations excited by the transmit ports of the two elements are along a common axis, or the polarizations received by the receive ports of the two elements are along a common axis.

22 Claims, 7 Drawing Sheets

(51) Int. Cl.
*H01Q 21/24* (2006.01)
*H01Q 21/26* (2006.01)

(56) References Cited

U.S. PATENT DOCUMENTS

| | | | | |
|---|---|---|---|---|
| 6,239,750 | B1* | 5/2001 | Snygg | H01Q 1/246 |
| | | | | 343/700 MS |
| 7,138,956 | B2 | 11/2006 | Nilsson | |
| 8,462,071 | B1* | 6/2013 | Rudish | H01Q 1/523 |
| | | | | 343/797 |
| 8,830,133 | B2* | 9/2014 | Weily | H01Q 1/38 |
| | | | | 343/767 |
| 2009/0051619 | A1 | 2/2009 | Hook et al. | |
| 2013/0285867 | A1 | 10/2013 | Wang et al. | |
| 2015/0188240 | A1* | 7/2015 | Eom | H01Q 21/28 |
| | | | | 343/853 |
| 2017/0012364 | A1 | 1/2017 | Yang et al. | |

OTHER PUBLICATIONS

Suh, Seong-Youp, et al., "High isolation antenna for multi-radio antenna system using a complementary antenna pair," 2007 IEEE Antennas and Propagation Society International Symposium, pp. 1229-1232, 2007.

Wong, Hang, et al., "Design of Dual-Polarized L-Probe Patch Antenna Arrays With High Isolation," IEEE Transactions on Antennas and Propagation, vol. 52, No. 1, pp. 45-52, 2004.

Qiu, Lei, et al., "Transmit-Receive Isolation Improvement of Antenna Arrays by Using EBG Structures," IEEE Antennas and Wireless Propagation Letters, vol. 11, pp. 93-96, 2012.

Tsakalaki, Elpiniki P., et al., "Antenna Cancellation for Simultaneous Cognitive Radio Communication and Sensing," 2013 International Workshop on Antenna Technology (iWAT), pp. 215-218, 2013.

Tsakalaki, Elpiniki P., et al., "A 2-order MIMO Full-Duplex Antenna System," The 8th European Conference on Antennas and Propagation, pp. 2546-2550, 2014.

Heino, Mikko, et al., "Recent Advances in Antenna Design and Interference Cancellation Algorithms for In-Band Full Duplex Relays," IEEE Communications Magazine, pp. 91-101, 2015.

Tianang, Elie G., "A Dipole Antenna System for Simultaneous Transmit and Receive," 2015 IEEE International Symposium on Antennas and Propagation & USNC/URSI National Radio Science Meeting, pp. 428-429, 2015.

Parbat, Rahul S., et al., "A Quantitative Solutions and Approaches for Mutual Coupling Reduction in MIMO Antenna," 2015 Second International Conference on Advances in Computing and Communication Engineering, pp. 164-169, 2015.

Kenny Seungwoo Ryu et al:"Wideband Dual-Polarized Microstrip Patch Excited by Hook Shaped Probes", IEEE Transactions on Antennas and Propagation, vol. 56, No. 12, Dec. 30, 2008, pp. 3645-3649, XP011240569.

* cited by examiner

LOW COUPLING 2×2 MIMO ARRAY

CROSS-REFERENCE TO RELATED APPLICATION

This is application claims priority from U.S. Provisional Patent Application No. 62/270,417 filed Dec. 21, 2015, the entirety of which is hereby incorporated by reference for all purposes.

TECHNICAL FIELD

The present description relates to an array antenna implementation, and in particular, to a 2×2 Multiple-Input-Multiple-Output (MIMO) antenna arrays.

BACKGROUND

Full-duplex antennas usually require high isolation between Tx and Rx ports, as data transmission and reception can occur at the same time at the same frequency. As a result full-duplex transmission and reception, the signal being transmitted can have the potential to overwhelm the other signals being received. In Multiple-Input-Multiple-Output (MIMO) array antenna implements the antenna elements are arranged on a finite ground plane and within a relatively low profile (i.e., depth of the antenna), which imposes space limitations to the antenna design and element positioning and orientation. Accordingly, designs and implementations which can achieve high isolation between Tx and Rx ports within a limited space are desired.

BRIEF DESCRIPTION OF THE DRAWINGS

These and other features of the disclosure will become more apparent from the description in which reference is made to the following appended drawings.

SUMMARY

Figure 1:
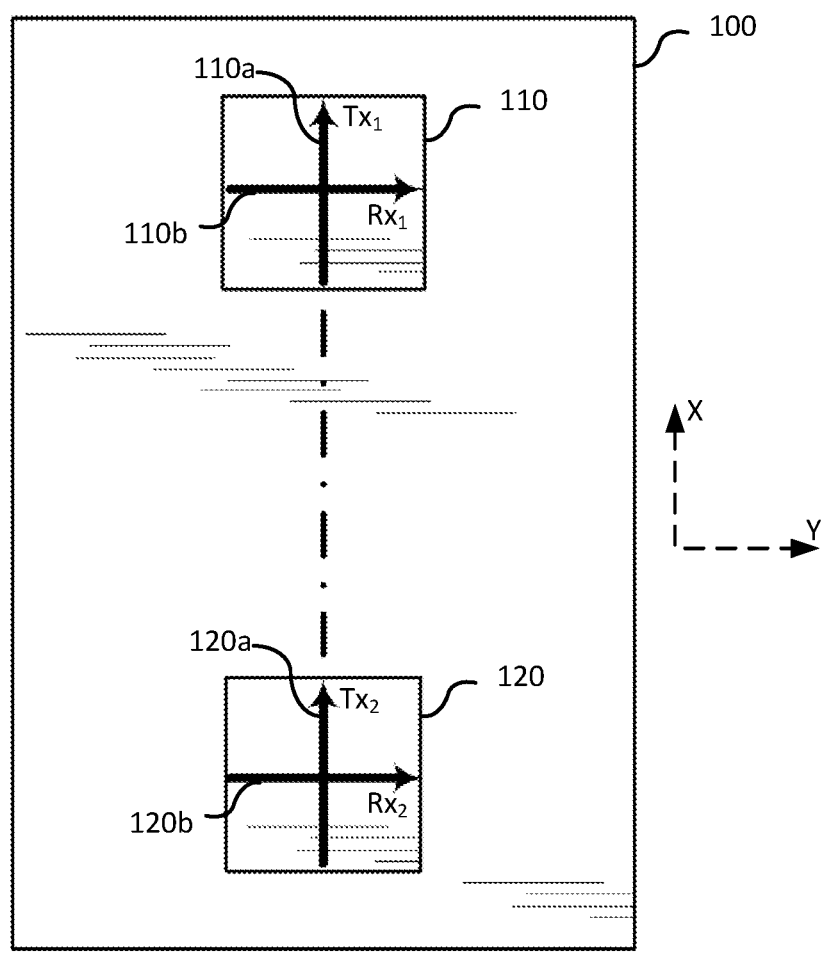
FIG. 1 is a schematic diagram of a 2×2 MIMO array antenna, according to an embodiment.

In accordance with an embodiment of the present disclosure there is provided a full-duplex 2×2 multiple-input-multiple-output (MIMO) array antenna comprising: an antenna reflector defining an x-y plane; and a first radiating element mounted above the antenna reflector having a first linear polarization element and a second linear polarization element orthogonal to the first linear polarization element; a second radiating element mounted above the antenna reflector having a first linear polarization element and a second polarization element orthogonal to the first linear polarization element; wherein the first polarization elements of the first and second radiating element are collinear and parallel to the x-axis of the x-y plane, the second orthogonal polarizations of the first and second radiating elements are parallel to each other and the y-axis of the x-y plane, and the reflector element provides and uninterrupted ground plane between the first radiating element and the second radiating element.

In a further embodiment of the full-duplex 2×2 MIMO array antenna a conductive fence is mounted to the antenna reflector between the first radiating element and the second radiating element along a line orthogonal to the common axis in the x-y plane.

In a further embodiment of the full-duplex 2×2 MIMO array antenna each element is a patch element.

In a further embodiment of the full-duplex 2×2 MIMO array antenna the patch element comprises a top resonator mounted above the antenna reflector.

In a further embodiment of the full-duplex 2×2 MIMO array antenna the patch element comprises a first pair of probe elements for the first linear polarization element and a second pair of probe elements for the second linear polarization orthogonal to the first linear polarization element.

In a further embodiment of the full-duplex 2×2 MIMO array antenna each of the probe elements comprise a generally T-shaped antenna probes, each antenna probe including at least one of a tapered probe top and a tapered probe leg.

In a further embodiment of the full-duplex 2×2 MIMO array antenna the probe elements comprise conductive material on a substrate.

In a further embodiment of the full-duplex 2×2 MIMO array antenna the substrate further comprises supports for retaining the top resonator above the antenna reflector.

In a further embodiment of the full-duplex 2×2 MIMO array antenna the probe elements further comprise a feed probe portion extending through vias in the antenna reflector to a feed network below the antenna reflector.

In a further embodiment of the full-duplex 2×2 MIMO array antenna the feed network couples each first linear polarization element and each second linear polarization element of the first radiating element and the second radiating element to a respective coaxial connector.

In a further embodiment of the full-duplex 2×2 MIMO array antenna the feed network comprises two stripline paths each one coupled to one of the pair of probes for the respective polarization element coupling the feed probe to the respective coaxial connector.

In a further embodiment of the full-duplex 2×2 MIMO array antenna one of the two stripline paths provides a 180° phase shift of a signal for the respective probe element relative to the other stripline path to the other probe element.

In a further embodiment of the full-duplex 2×2 MIMO array antenna the antenna reflector is a finite ground plane of approximately 3.5λ×2.3λ where λ is a wavelength.

In a further embodiment of the full-duplex 2×2 MIMO array antenna a spacing between the first radiating element and the second radiating element is 1.4λ.

In a further embodiment of the full-duplex 2×2 MIMO array antenna the antenna reflector is a finite ground plane of approximately 2.3λ×1.7λ where λ is a wavelength.

In a further embodiment of the full-duplex 2×2 MIMO array antenna a spacing between the first radiating element and the second radiating element is 0.9λ.

In a further embodiment of the full-duplex 2×2 MIMO array antenna the first radiating element and second radiating element is formed by a dual linear polarized dipoles.

In a further embodiment of the full-duplex 2×2 MIMO array antenna the first radiating element and second radiating element is formed by slot-coupled patches.

In a further embodiment of the full-duplex 2×2 MIMO array antenna each first linear polarization element is for transmission and each second linear polarization element is for reception.

In a further embodiment of the full-duplex 2×2 MIMO array antenna each first linear polarization element is for reception and each second linear polarization element is for transmission.

DETAILED DESCRIPTION

The following detailed description contains, for the purposes of explanation, various illustrative embodiments, implementations, examples and specific details in order to provide a thorough understanding of the invention. It is apparent, however, that the disclosed embodiments may be practiced, in some instances, without these specific details or with an equivalent arrangement. The description should in no way be limited to the illustrative implementations, drawings, and techniques illustrated below, including the designs and implementations illustrated and described herein, but may be modified within the scope of the appended claims along with their full scope of equivalents.

Full-duplex antennas generally require high isolation between transmit (Tx) and receive (Rx) ports. In some applications, the requirement for isolation between Tx and Rx ports can be as high as 45 dB (i.e., power coupling below about $\frac{1}{31000}$). Such high isolation can be difficult to achieve within a finite ground plane provided in an antenna array, with dimensions of for example 300 mm×200 mm (and with an antenna profile of 20 mm), or 150 mm×200 mm (again with a 20 mm profile).

Disclosed herein are implementations of a 2×2 multiple-input-multiple-output (MIMO) array antenna including two Tx ports and two Rx ports. According to the described embodiments, low port-to-port coupling between Tx and Rx ports can be achieved on a finite ground plane and within a relative low profile. FIG. 1 shows a schematic diagram of a 2×2 MIMO array antenna 100 according to an embodiment of the disclosure. The antenna 100 includes two separate patch elements 110, 120. Each patch element 110, 120 is linearly polarized with two orthogonal polarizations, one polarization 110a, 120a excited by a respective Tx port and the other polarization excited 110b, 120b by a respective Rx port. Conventional antenna Tx and Rx ports are usually arranged at +/−45 degree on the x-y plane for optimal performance, however, as illustrated in FIG. 1, the polarizations of each patch element 110, 120 are rotated to 0 and 90 degrees on the x-y plane where each patch element 110, 120 accordingly can form a line or lines of symmetry along one or both of the x and y axes.

As illustrated in FIG. 1, the polarization 110a excited by Tx port of the patch element 110 is collinear with the polarization 120a excited by Tx port of the patch element 120, such that the lines of symmetry of the two patch elements 110, 120 coincide with each other and, therefore, the other polarizations 110b, 120b are parallel. The design makes use of the common line of symmetry between the two elements to reduce coupling between ports of orthogonal linear polarizations. Although the embodiment of FIG. 1 shows an alignment of polarizations excited by Tx ports, it should be understood that the design can be easily modified so that polarizations excited by Rx ports are aligned instead. In addition either the Tx ports or the Rx ports can be configured to excite the horizontal polarization and the other port configured to excite the vertical polarization. It will be understood by those skilled in the art that deviations from the alignment described above may have negative effects on the isolation. Such deviations, are permitted within the design so long as their effect on isolation is within the design specifications. In an embodiment, the 2×2 MIMO array antenna is realized on a finite ground plane of approximately 300 mm×200 mm (3.5λ×2.3λ) and the spacing between the two centers of the elements 110, 120 is approximately 120 mm (1.4λ), where λ is the wavelength. In an alternative implementation the finite ground plane may be approximately 200 mm×150 mm (2.3λ×1.7λ) and the spacing between the two elements is approximately and the spacing between the two centers of the elements 110, 120 is approximately 77 mm (0.7λ).

Figure 2:
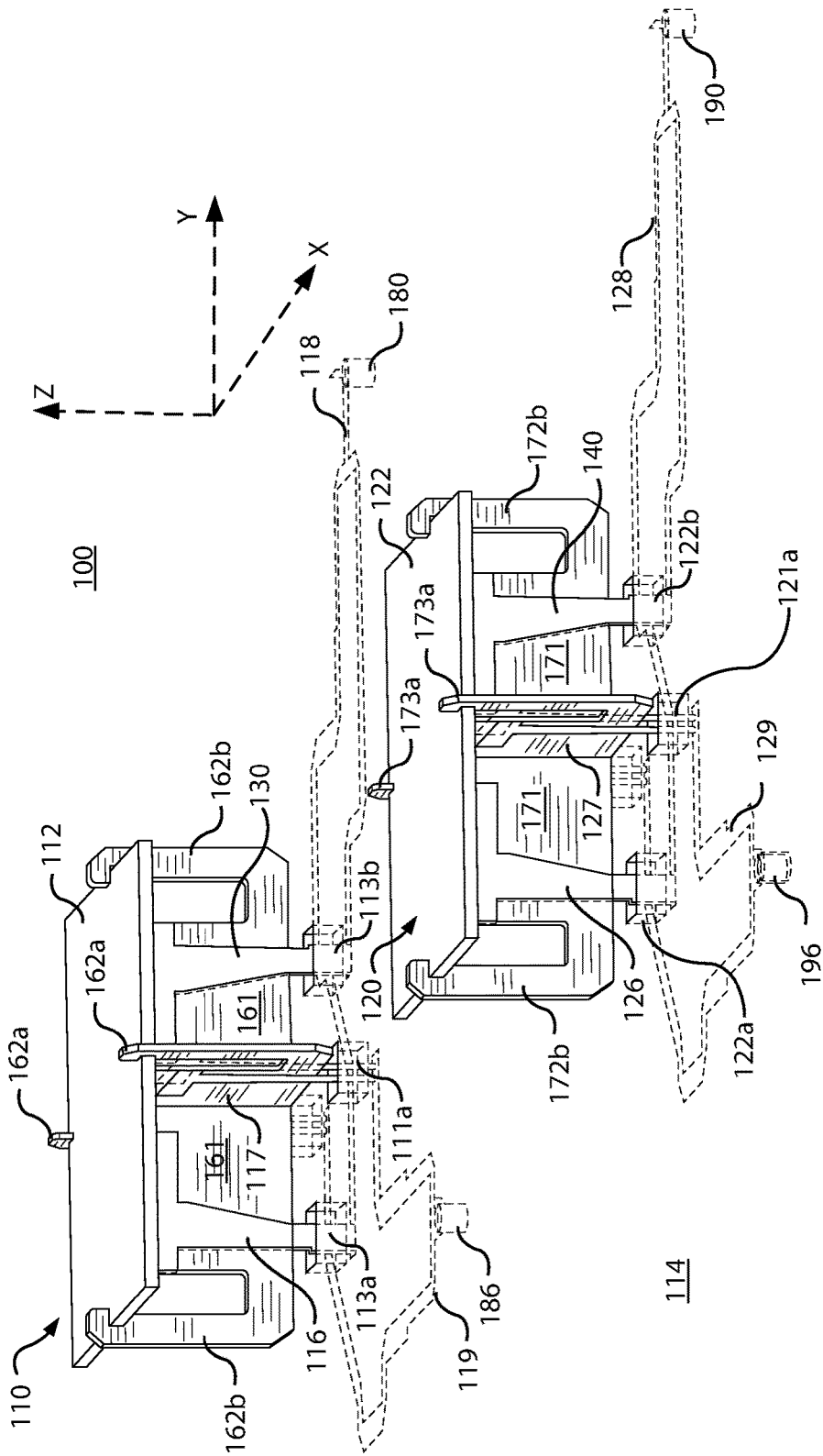
FIG. 2 is an isometric and semi-transparent view of the 2×2 MIMO array antenna according to an embodiment.

FIG. 2 shows an isometric view of the 2×2 MIMO array antenna 100, according to an embodiment. The antenna 100 includes an antenna reflector 114, made from a conductive material, such as for example Aluminum, or alternatively a substrate coated with a conductive material may be utilized for providing a finite x-y ground plane. The two separate patch elements 110, 120 are supported above the antenna reflector 114 ground plane. Each patch element 110, 120 includes a top resonator 112, 122 forming a "patch". The patch elements 110, 120 are excited with a plurality of conductive antenna probe structures aligned to provide the respective orthogonal polarization. For example for Rx1 110b antenna probe structures 116, 130 are arranged along the y-axis and for Rx2 120b antenna probe structure 126, 140 are also arranged along the y-axis. In this example the probe structures 116, 130 are formed by a conductive material on either side of a PCB support 161 and probe structures 126, 140 are formed on PCB support 171. Similarly antenna probe structures are provided along the x-axis for Tx1 110a and Tx2 120a on PCB support 117 and 127 respectively in FIG. 2. Each probe structure has a feed probe portion for connection to the feed network provided below the reflector 114. For Rx1 polarization 110b, the probe structure 116 has a respective feed probe 113a and probe structure 130 has a feed probe 113b which connects to a feed network 118 and connector 180 on the underside of the reflector 114 through vias (shown in FIG. 6) or openings in the reflector surface 114. Similarly for Rx2 polarization 120b, the probe structure 126 has a respective feed probe 122a and probe structure 140 has a feed probe 122b which connects to a feed network 128 and connector 190 on the underside of the reflector 114. The Tx1 feed probe 111a is coupled to the feed network 119 and connector 186 and Tx2 feed probe 121a is connected to feed network 129 and connector 196. The feed networks 118, 119, 128, 129 comprise two paths to each probe element forming the respective polarization.

The PCB supports 161, 117, 171, 127 can support the antenna reflector 114 above the probe structures. In the example provided the PCB supports 161, 171 each have non-conductive arms 162a, 162b, 172a, 172b having slots or clips for receiving the antenna reflector 114. Alternatively the antenna reflector 114 may be secured or supported by other separate non-conductive elements coupled to the probes or the antenna reflector 114 and not necessarily be required to be part of the probe structure. Generally, except for those vias allowing for connection, the antenna reflector 114 is of simple manufacture, uninterrupted by voids or trenches that otherwise may re-characterize the electromagnetic properties of the reflector 114, and in particular in the ground plane between patch element 110 and patch element 120.

By keeping the polarizations aligned and having a common axis of symmetry between the two antenna elements, the cross-polarity coupling can remain low within each element and between the two elements. According to the embodiment, coupling between the Tx ports 180, 190 and the Rx ports 186, 196 can achieve below −45 dB in a desired frequency range, such as the range between 3.4 GHz and 3.6 GHz. Those skilled in the art will appreciate that the exemplary embodiments provided in the Figures make use of physical dimensions that are relevant to the specified frequency range. Variation from these dimensions will be required to support different frequency bands.

Figure 3:
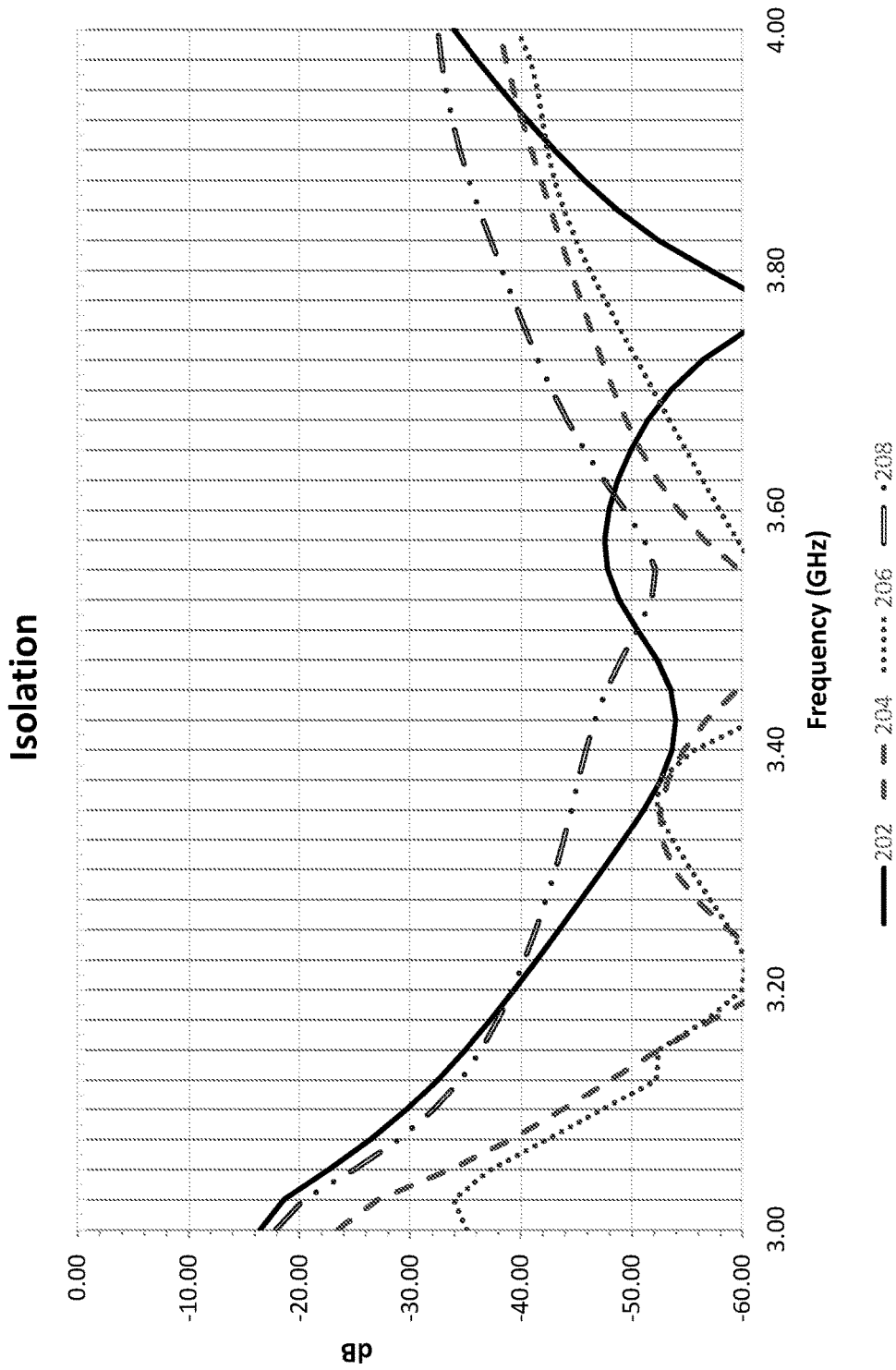
FIG. 3 shows a simulation result showing coupling (in dB) between Tx and Rx ports according to an embodiment.

FIG. 3 shows a simulation result showing coupling (in dB) between the Tx and Rx ports, according to an embodiment. Line 202 shows the result of coupling between Tx port 186 and Rx 180; line 204 shows the result of coupling between Tx port 196 and Rx 180; line 206 shows the result of coupling between Tx port 196 and Rx 180; and line 208 shows the result of coupling between Tx port 196 and Rx 190. The simulation result in FIG. 3 shows that all coupling between the Tx and Rx ports can be below 45 dB across the range of 3.4 GHz-3.6 GHz.

Figure 4:
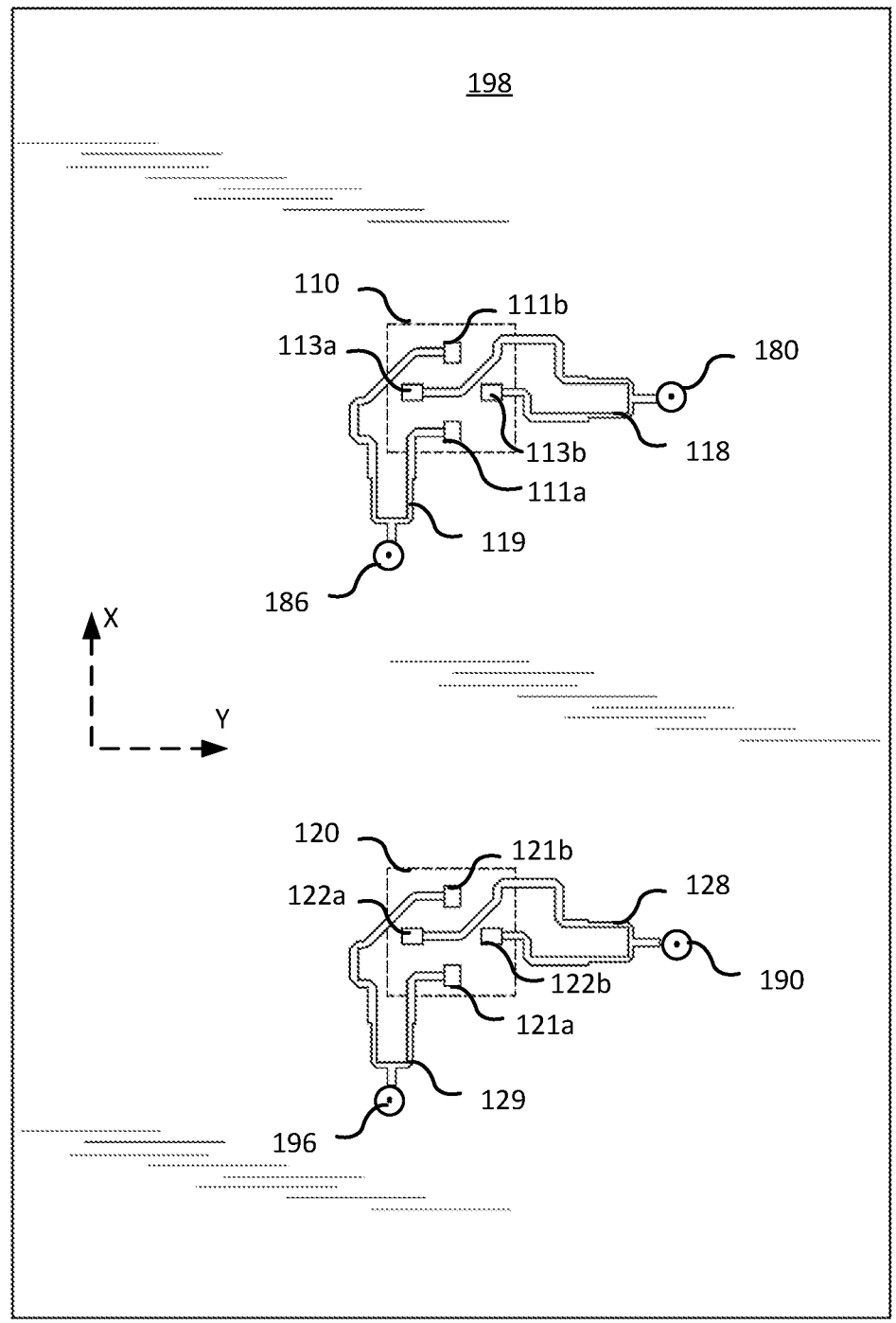
FIG. 4 is a bottom view of the feed network printed circuit board (PCB) of the 2×2 MIMO array antenna according an embodiment.

FIG. 4 shows a bottom view of the feed network PCB mounted 198 on the underside of the reflector 114. The probes of each antenna element are connected to Rx ports 180, 190 which in turn connects to feed networks 118, 128 respectively and Tx ports 186, 196 are connected to feed networks 119, 129 respectively. The ports can be provided by a coaxial connector on the PCB 198 extending downward opposite the antenna elements from the reflector 114 plane. Each feed network 118, 128, 119, 128 provides two branches to two feed probes. One of the branches of each feed network is routed to provide a 180° phase shift to the pair of probes associated with the respective radiating element polarization.

Figure 5:
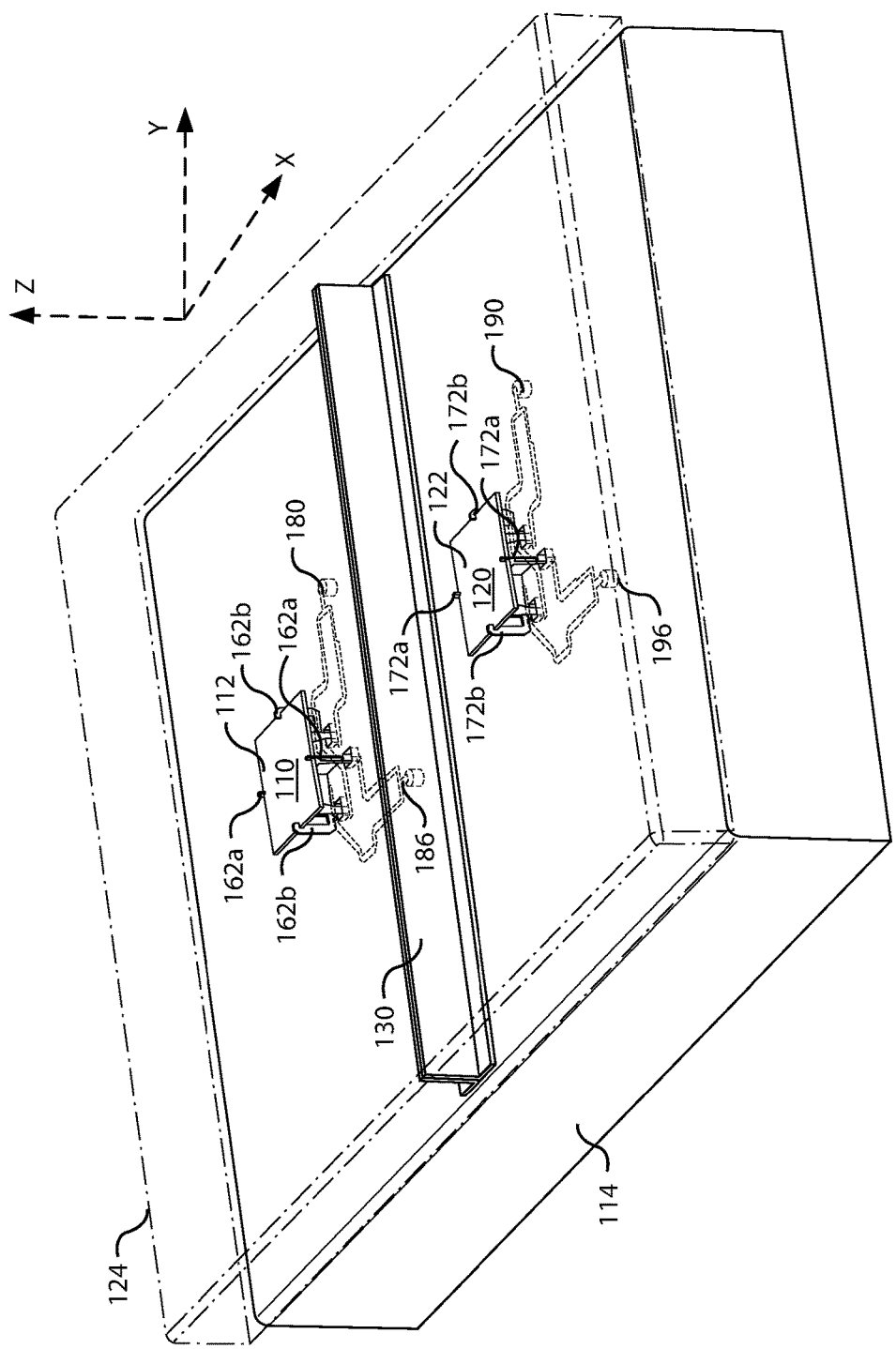
FIG. 5 is an isometric view of the 2×2 MIMO array antenna with a conductive fence according to an embodiment.

FIG. 5 shows an isometric view of the 2×2 MIMO array antenna 100 with the addition of a conductive fence 130, according to a further embodiment of the disclosure. According to this embodiment, a conductive fence 130 is arranged orthogonal to the common line of symmetry (in this case, the x axis) at midpoint between the two elements 110, 120 in contact with the reflector 114 beneath a radome 124. The conductive fence 130 can help shape beams from the radiating elements 110, 120 and mitigate effects of the non-infinite ground plane on the radiation pattern. Although a single conductive fence 130 is shown in this embodiment, it should be understood that a plurality of spaced apart conductive fences can be used to replace the single conductive fence 130.

Figure 6:
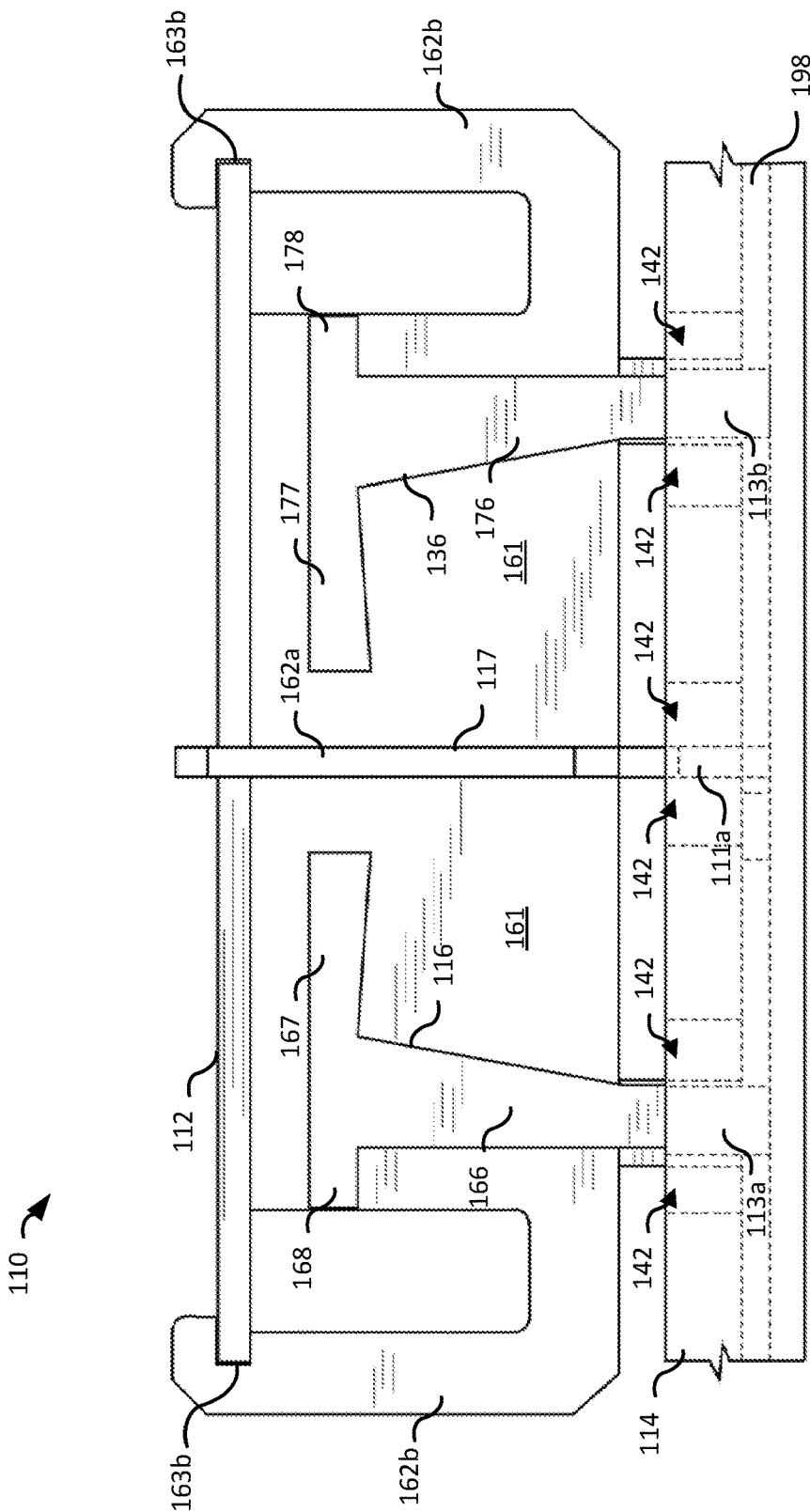
FIG. 6 is a cross-sectional view of an antenna element, taken along they axis of the ground plane, according an embodiment.

FIG. 6 shows a cross-sectional view of the antenna element 110 taken along the y axis. According to the embodiment illustrated in FIG. 6, the feed probes 116, 136 can have a tapered probe leg 166, 176 and/or a tapered probe top 167, 177. The tapering can add a degree of freedom for tuning the element input match. Those skilled in the art will appreciate that the direction of tapering depends on parameters such as capacitance, coupling, and/or inductance in the feed. The probes 116, 136 can have an extension 168, 178 at the probe end forming a generally T-shaped cross-section of the probe. The antenna elements 110, 120 having such particularly shaped probes 116, 136 can help achieve a broad bandwidth within the low profile of the antenna. In this example the probes 116, 136 are provided by a conductive stripline on a PCB support structure 161. One or both of the PCB support structures 161, 117 may have a slot (not shown) to receive the other PCB support in a cross shape configuration. Alternatively the PCB support structure 161 may comprise segments which are coupled or arranged to provide the cross shape required to align the probes to provide orthogonal polarizations for each element. The PCB support structure 161, 171 extend through respective vias 142 in the antenna reflector 114 to allow feed probe connections 111b to interface with the feed network PCB 198.

According to this particular implementation, the feed probe 116 includes a probe top 173, 177 may be approximately 9 mm long. The spacing between two feed probes tops 173, 177 for one common port may be approximately 4.6 mm. The top resonator 112 may be a length of approximately 29.2 mm along one axis. The spacing between the top of the feed probes 173, 177 and the resonator 112 may be approximately 1.3 mm.

Figure 7:
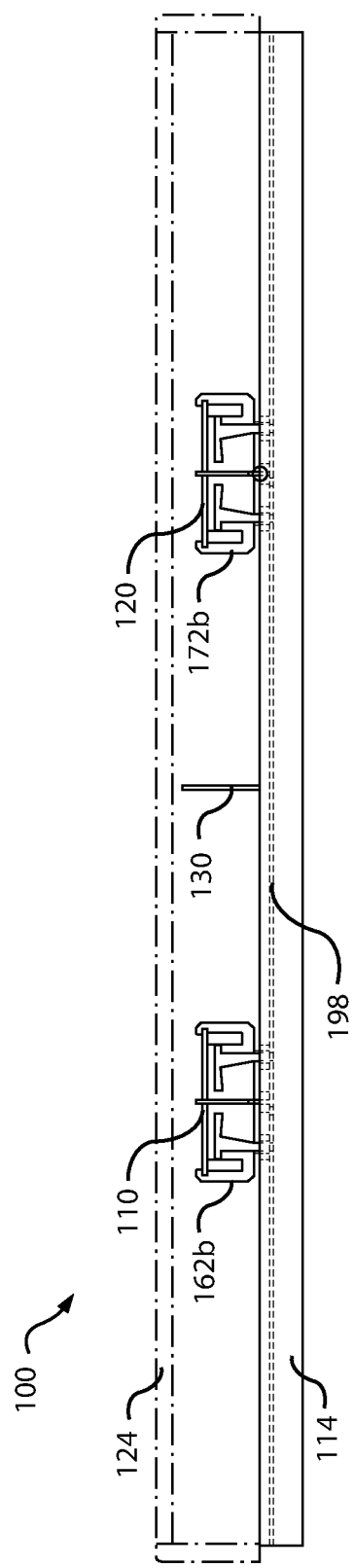
FIG. 7 is a cross-sectional view of the 2×2 MIMO array antenna, taken along the x axis of the ground plane, according an embodiment.

FIG. 7 shows a cross-sectional view of the 2×2 MIMO array antenna, taken along the x axis. According to an embodiment, the height of the conductive fence 130 may be approximately 15.8 mm. The distance from the radome 124 to the reflector 114 may be approximately 20 mm in an embodiment. It can be seen that the antenna is designed within a relatively low profile. The dimensions described can vary based upon the frequency of operation of the 2×2 MIMO array antenna and desired radiation pattern.

Although some embodiments described above use patch elements for the two radiating elements, it should be understood that any element that is linearly polarized with two orthogonal polarizations in the x-y plane (i.e., plane of the antenna reflector) can be used. As well, although the patch is shown to be fed by feed probes, it should be understood that other topologies can be used. For example, elements with dual linear polarized dipoles, or slot-coupled patches can be used.

In general, a 2×2 MIMO array antenna is provided which includes two separate radiating elements mounted to an antenna reflector. Each element is linear polarized with two orthogonal polarizations, one polarization excited by a Tx port and the other polarization excited by a Rx port. The two elements are aligned that the polarizations excited by the Tx ports of the two elements are along a common axis, or the polarizations excited by the Rx ports of the two elements are along a common axis. A conductive fence can be used and placed orthogonal to the common axis. The antenna element can have additional features in the feed probes by having a tapered feed and an extension at the probe end. According to the described embodiments, an implementation for 2×2 MIMO full duplex operation can be achieved with a low-profile compact antenna array, across a relatively broad bandwidth.

While in some embodiments specific numbers are provided for the dimensions, it should be apparent to a person skilled in the art that the design is not limited to the specific numbers and can be modified, for example, depending on the requirement of the finite ground plane, the frequency of operation, and other parameters.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g., "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

What is claimed is:

1. A multiple-input-multiple-output (MIMO) array antenna comprising:
   an antenna reflector defining a ground plane;
   first and second linear polarization elements mounted above the ground plane and arranged along a first axis, the first and second linear polarization elements being oriented and aligned along the first axis; and
   third and fourth linear polarization elements mounted above the ground plane and arranged along the first axis, the third and fourth linear polarization elements being oriented perpendicularly to the first axis;
   wherein each of the first, second, third, and fourth linear polarization elements is coupled to a respective feed port to provide a respective linearly polarized transmission, and the first, second, third, and fourth linear polarization elements all provide the respective linearly polarized transmission at a same frequency band.

2. The array antenna according to claim 1, further comprising:
   a first feed port coupled to the first linear polarization element;
   a second feed port coupled to the second linear polarization element;
   a third feed port coupled to the third linear polarization element; and
   a fourth feed port coupled to the fourth linear polarization element.

3. The array antenna according to claim 2, wherein:
   the first and second feed ports are transmit ports; and
   the third and fourth ports are receive ports.

4. The array antenna according to claim 2, wherein:
   the first and second feed ports are receive ports; and
   the third and fourth ports are transmit ports.

5. The array antenna according to claim 1, further comprising:
   a first radiating element coupled to the first and third linear polarization elements; and
   a second radiating element coupled to the second and fourth linear polarization elements.

6. The array antenna according to claim 5, further comprising a conductive fence mounted to the antenna reflector between the first radiating element and the second radiating element along a line orthogonal to the first axis.

7. The array antenna according to claim 5, wherein each one of the first and second radiating elements is a patch element.

8. The array antenna according to claim 7, wherein each patch element comprises a top resonator mounted above the antenna reflector.

9. The array antenna according to claim 8, wherein each one of the first, second, third and fourth linear polarization elements comprises a pair of probe elements.

10. The array antenna according to claim 9, wherein each one of the pair of probe elements comprises a generally T-shaped antenna probe, the antenna probe including at least one of a tapered probe top and a tapered probe leg.

11. The array antenna according to claim 9 wherein each one of the pair of probe elements comprises conductive material on a substrate.

12. The array antenna according to claim 11 wherein the substrate further comprises supports for retaining the top resonator above the antenna reflector.

13. The array antenna according to claim 11 wherein each one of the probe elements further comprise a feed probe portion extending through vias in the antenna reflector to a respective feed network below the antenna reflector.

14. The array antenna according to claim 13 wherein the respective feed network couples one of the first, second, third and fourth linear polarization elements to a respective coaxial connector.

15. The array antenna according to claim 14 wherein for each respective linear polarization element, the feed network comprises two stripline paths, each one being coupled to one of the pair of probe elements; and
   each respective pair of probe elements being coupled to the respective coaxial connector.

16. The array antenna according to claim 15 wherein one of the two stripline paths provides a 180° phase shift of a signal for one of the pair of probe elements relative to the other stripline path to the other of the pair of probe elements.

17. The array antenna according to claim 5 wherein the antenna reflector is a finite ground plane of approximately $3.5\lambda \times 2.3\lambda$ where $\lambda$ is a wavelength.

18. The array antenna according to claim 17 wherein a spacing between the first radiating element and the second radiating element is approximately $1.4\lambda$.

19. The array antenna according to claim 5 wherein the antenna reflector is a finite ground plane of approximately $2.3\lambda \times 1.7\lambda$ where $\lambda$ is a wavelength.

20. The array antenna according to claim 19 wherein a spacing between the first radiating element and the second radiating element is $0.9\lambda$.

21. The array antenna according to claim 5 wherein the first radiating element and second radiating element are formed by dual linear polarized dipoles.

22. The array antenna according to claim 5 wherein the first radiating element and second radiating element are formed by slot-coupled patches.

* * * * *